US012747323B2

(12) United States Patent
Wienkenhöver et al.

(10) Patent No.: US 12,747,323 B2
(45) Date of Patent: Sep. 29, 2026

(54) MIXTURE OF POLYMERIC ALKYL SILICATES

(71) Applicant: WACKER CHEMIE AG, Munich (DE)

(72) Inventors: Niklas Wienkenhöver, Munich (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 549 days.

(21) Appl. No.: 18/288,827

(22) PCT Filed: May 5, 2021

(86) PCT No.: PCT/EP2021/061905

§ 371 (c)(1),
(2) Date: Oct. 30, 2023

(87) PCT Pub. No.: WO2022/233409

PCT Pub. Date: Nov. 10, 2022

(65) Prior Publication Data

US 2024/0218128 A1 Jul. 4, 2024

(51) Int. Cl.
*C08G 77/02* (2006.01)
*C08G 77/18* (2006.01)
*C08G 77/48* (2006.01)

(52) U.S. Cl.
CPC ............. *C08G 77/02* (2013.01); *C08G 77/18* (2013.01); *C08G 77/48* (2013.01)

(58) Field of Classification Search
CPC ....................................................... C08G 77/02
See application file for complete search history.

(56) References Cited

U.S. PATENT DOCUMENTS

| | | | | |
|---|---|---|---|---|
| 2,643,263 A * | 6/1953 | Morgan | C07F 7/04 | 252/78.3 |
| 3,223,342 A * | 12/1965 | Brandon | G11B 15/674 | 242/586.6 |
| 3,992,429 A | 11/1976 | Knollmueller | | |
| 3,997,501 A * | 12/1976 | McLeod | C08G 77/48 | 524/99 |
| 4,132,664 A | 1/1979 | Knollmueller | | |
| 6,005,132 A * | 12/1999 | Weidner | C07F 7/04 | 556/483 |
| 2004/0127363 A1 * | 7/2004 | Guzman | C07F 7/0838 | 504/193 |
| 2017/0210763 A1 * | 7/2017 | Krafczyk | C08G 77/08 | |

FOREIGN PATENT DOCUMENTS

| | | | | |
|---|---|---|---|---|
| EP | 0890597 A1 * | 1/1999 | C08G 77/02 |
| EP | 3351547 A1 * | 7/2018 | C07F 7/04 |
| GB | 709346 A * | 5/1954 | C07F 7/04 |
| JP | 2016526073 A | 9/2016 | |
| WO | 2014207885 A1 | 12/2014 | |
| WO | 2022083852 A1 | 4/2022 | |

OTHER PUBLICATIONS

"Structure-Propety Behavior of New Hybrid materials Incorporating Oligomeric Poly(tetramethylene oxide) with Inorganic Silicates by a Sol Gel Process" authored by Huang et al. and published in Polymer Bulletin (1987) 18, 455-562.*

Peppard D F, et al.: "Preparation and synthetic applications of alkyl chlorosilicates", Journal of the American Chemical Society, Jan. 1, 1946, American Chemical Society, Jan. 1, 1946, vol. 68, pp. 70-72.

* cited by examiner

*Primary Examiner* — Marc S Zimmer

(57) ABSTRACT

An organosilicon compound includes a mixture of polymeric alkyl silicates. The polymeric alkyl silicates include at least 90% by weight a mixture of polymeric alkyl silicates of the formula (I) $[SiO_{4/2}]_a$ $[(R^xO)SiO_{3/2}]_b$ $[(R^yO)SiO_{3/2}]_{b'}$ $[(R^xO)_2SiO_{2/2}]_c$ $[(R^xO)(R^yO)SiO_{2/2}]_{c'}$ $[(R^yO)_2SiO_{2/2}]_{c''}$ $[(R^xO)_3SiO_{1/2}]_d$ $[(R^xO)_2(R^yO)SiO_{1/2}]_{d'}$ $[(R^xO)(R^yO)_2SiO_{1/2}]_{d''}$ $[(R^yO)_3SiO_{1/2}]_{d'''}$ $[O_{1/2}R^zO_{1/2}]_e$ $[O_{1/2}R^zOH]_{e'}$ $[O_{1/2}R^zOR^x]_{e''}$ $[O_{1/2}R^zOR^{y*}]_{e'''}$ (I). Polymeric alkyl silicates of a formula II are excluded.

15 Claims, No Drawings

MIXTURE OF POLYMERIC ALKYL SILICATES

CROSS-REFERENCE TO RELATED APPLICATION

This application is a U.S. National Phase Application of PCT/EP2021/061905, filed May 5, 2021, the contents of which is hereby incorporated by reference in its entirety.

BACKGROUND

The invention relates to a novel mixture of polymeric alkyl silicates.

Silicones are an industrially very important class of substances that are used in numerous fields of technology. Industrially important properties of silicones are for example their low tendency to crystallize, which distinguishes silicones from carbon-based polymers. Silicones remain liquid over wide temperature ranges and have very low glass transition temperatures.

However, due to the Si-bonded alkyl moieties present, silicones do not break down at all readily in the environment. This property increasingly limits the possible applications for silicones. There is accordingly a steadily growing demand for alternative materials that can in principle undergo hydrolytic cleavage but nevertheless have sufficient hydrolytic stability for practical uses and which are able to replace conventional silicones.

U.S. Pat. Nos. 3,992,429 and 4,132,664 disclose siliceous compounds of formula $[(R^aO)_3SiO]_3Si—O—KW—O—Si[OSi(OR^a)_3]_3$, wherein KW represents a hydrocarbon radical. However, these systems have low molecular weight.

In many technical applications, however, low molecular weight compounds are undesirable because of their volatility and their migration behavior.

Linear polymeric alkyl silicates of the formula (II) are described in the application PCT/EP2020/079521:

(II)

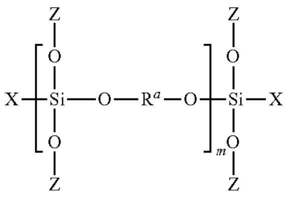

where

- Z is a radical of formula $—Si(OR^b)_3$ or a radical of formula $—CR^c_3$,
- $R^a$ is each independently a divalent unsubstituted or substituted carbon-bonded radical or a divalent silicon-bonded radical,
- $R^b$ is each independently a monovalent unsubstituted or substituted hydrocarbon radical having 4 to 40 carbon atoms which is branched at the α-carbon atom or is doubly branched at the β-carbon atom,
- $R^c$ is each independently a monovalent unsubstituted or substituted hydrocarbon radical having 1 to 50 carbon atoms,
- X is a halogen atom, an oxygen-bonded unsubstituted or substituted $C_1$- to $C_{40}$-hydrocarbon radical, wherein individual carbon atoms may be replaced by oxygen atoms, a radical of formula $—O—Si(OR^b)_3$ or a radical of formula $—OSiR''_3$,

- $R''$ is each independently a monovalent unsubstituted or substituted $C_1$- to $C_{40}$-hydrocarbon radical and
- m is an integer of at least 2 and at most 1000.

It is accordingly an object of the present invention to overcome the abovementioned disadvantages and provide polymeric alkyl silicates which have similar properties to silicones and can therefore replace silicones.

The object is achieved by the invention.

BRIEF SUMMARY

Embodiments of an organosilicon compound are provided herein. In an embodiment, the organosilicon compound comprising a mixture of polymeric alkyl silicates, comprising at least 90% by weight of a mixture of polymeric alkyl silicates of the formula (I)

$$[SiO_{4/2}]_a[(R^xO)SiO_{3/2}]_b[(R^yO)SiO_{3/2}]_{b'}[(R^xO)_2SiO_{2/2}]_c$$
$$[(R^xO)(R^yO)SiO_{2/2}]_{c'}[(R^yO)_2SiO_{2/2}]_{c''}[(R^xO)_3SiO_{1/2}]_d$$
$$[(R^xO)_2(R^yO)SiO_{1/2}]_{d'}[(R^xO)(R^yO)_2SiO_{1/2}]_{d''}[(R^yO)_3SiO_{1/2}]_{d'''}$$
$$[O_{1/2}R^zO_{1/2})_e[O_{1/2}R^zOH]_{e'}$$
$$[O_{1/2}R^zOR^X)_{e''}[O_{1/2}R^zOR^{y*}]_{e'''},$$

wherein

- the indices a, b, b', c, c', c'', d, d', d'', d''', e', e'' and e''' independently of one another indicate a number in the range from 0 to 5000, where the index e is a number in the range of 2 to 5000, with the proviso that the sum of all indices is at least 5;
- the radicals $R^x$ are each independently selected from radicals that satisfy at least one of the following conditions:
  - (a) $R^x$ is a radical of the formula $—CHR^p_2$ or $—CR^p_3$, wherein $R^p$ is each independently a monovalent unsubstituted or substituted hydrocarbon radical having 1 to 50 carbon atoms,
  - (b) $R^x$ is a substituted or unsubstituted, $C_5$-$C_{20}$ hydrocarbon radical that is doubly branched at the β-carbon atom,
  - (c) $R^x$ is an unsubstituted or alkyl-substituted cyclopentyl, cyclohexyl or cycloheptyl radical having a total of not more than 9 carbon atoms;
- the radicals $R^y$ are each independently a hydrogen atom, a methyl, ethyl, n-propyl or n-butyl radical, preferably a methyl or ethyl radical;
- in which the radicals $OR^y$ may be partially replaced by Si-bonded H atoms;
- $R^{y*}$ is a methyl, ethyl, n-propyl or n-butyl radical, preferably a methyl or ethyl radical;
- the radicals $R^z$ are each independently a divalent unsubstituted or substituted radical bonded via carbon or a divalent radical bonded via silicon, in which individual carbon or Si atoms may be replaced by oxygen atoms;
- with the proviso that the units $[O_{1/2}R^zO_{1/2}]$ are bonded to two units independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$, $[(R^xO)_3SiO_{1/2}]$, $[(R^xO)_2(R^yO)SiO_{1/2}]$, $[(R^xO)(R^yO)_2SiO_{1/2}]$ and $[(R^yO)_3SiO_{1/2}]$;
- with the proviso that the units $[O_{1/2}R^ZOH]$, $[O_{1/2}R^ZOR^X]$ and $[O_{1/2}R^zOR^{y*}]$ are bonded to one unit independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$; with the proviso that the molar proportion of all radicals $R^y$ in the polymeric alkyl silicate is at most 50 mol %, based on the molar amount of the sum of all radicals $R^x$, $R^y$ and $R^{y*}$, wherein the molar fraction for the radical $OR^y$ equal to hydrogen is at most 33 mol %, based on the molar amount of the sum of all radicals $OR^x$ and $OR^y$;

and with the proviso that the following polymeric alkyl silicates, consisting exclusively of compounds of formula II, are excluded:

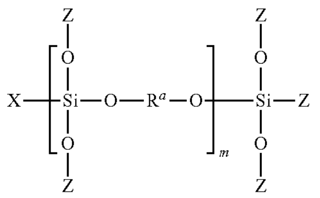

wherein

Z is a radical of formula $—Si(OR^b)_3$ or a radical of formula $—CR^c_3$, $R^a$ is each independently a divalent unsubstituted or substituted carbon-bonded radical or a divalent silicon-bonded radical, $R^b$ is each independently a monovalent unsubstituted or substituted hydrocarbon radical having 4 to 40 carbon atoms which is branched at the α-carbon atom or is doubly branched at the β-carbon atom, $R^c$ is each independently a monovalent unsubstituted or substituted hydrocarbon radical having 1 to 50 carbon atoms, X is a halogen atom, an oxygen-bonded unsubstituted or substituted $C_1$- to $C_{40}$-hydrocarbon radical, wherein individual carbon atoms may be replaced by oxygen atoms, a radical of formula $—O—Si(OR^b)_3$ or a radical of formula $—OSiR''_3$, $R''$ is each independently a monovalent unsubstituted or substituted $C_1$- to $C_{40}$-hydrocarbon radical and m is an integer of at least 2 and at most 1000.

DETAILED DESCRIPTION

The invention relates to an organosilicon compound comprising a mixture of polymeric alkyl silicates, comprising at least 90% by weight, preferably at least 95% by weight, of a mixture of polymeric alkyl silicates of the formula (I)

$$[SiO_{4/2}]_a\ [(R^xO)SiO_{3/2}]_b\ [(R^yO\,SiO_{3/2}]_{b'}\ [(R^xO)_2SiO_{2/2}]_c\ [(R^xO)(R^yO)SiO_{2/2}]_{c'}\ [(R^yO)_2SiO_{2/2}]_{c''}\ [(R^xO)_3SiO_{1/2}]_d\ [(R^xO)_2(R^yO)SiO_{1/2}]_{d'}\ [(R^xO)(R^yO)_2SiO_{1/2}]_{d''}\ [R^yO)_3SiO_{1/2}]_{d'''},\ [O_{1/2}R^zO_{1/2}]_e\ [O_{1/2}R^zOH]_{e'}\ [O_{1/2}R^zOR^x]_{e''}\ [O_{1/2}R^zOR^{y*}]_{e'''} \quad (I)$$

wherein the indices a, b, b', c, c', c'', d, d', d'', d''', e', e'' and e''' are each independently a number in the range from 0 to 5000, preferably 0 to 500, preferably 0 to 20, the index e is a number in the range from 2 to 5000, preferably 2 to 500, preferably 2 to 100, especially 2 to 20, with the proviso that the sum of all indices is at least 5;

the radicals $R^x$ are each independently selected from radicals that satisfy at least one of the following conditions:

(a) $R^x$ is a radical of the formula $—CHR^p_2$ or $—CR^p_3$, wherein $R^p$ is each independently a monovalent unsubstituted or substituted hydrocarbon radical having 1 to 50 carbon atoms, (b) $R^x$ is a substituted or unsubstituted, $C_5$-$C_{20}$ hydrocarbon radical that is doubly branched at the β-carbon atom, (c) $R^x$ is an unsubstituted or alkyl-substituted cyclopentyl, cyclohexyl or cycloheptyl radical having a total of not more than 9 carbon atoms;

the radicals $R^y$ are each independently a hydrogen atom, a methyl, ethyl, n-propyl or n-butyl radical, preferably a methyl or ethyl radical;

in which the radicals $OR^y$ may be partially replaced by Si-bonded H atoms;

$R^{y*}$ is a methyl, ethyl, n-propyl or n-butyl radical, preferably a methyl or ethyl radical;

the radicals $R^z$ are each independently a divalent unsubstituted or substituted radical bonded via carbon or a divalent radical bonded via silicon, in which individual carbon or Si atoms may be replaced by oxygen atoms;

with the proviso that the units $[O_{1/2}R^zO_{1/2}]$ are bonded to two units independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$, $[(R^xO)_3SiO_{1/2}]$, $[(R^xO)_2(R^yO)SiO_{1/2}]$, $[(R^xO)(R^yO)_2SiO_{1/2}]$ and $[(R^yO)_3SiO_{1/2}]$;

with the proviso that the units $[O_{1/2}R^zOH]$, $[O_{1/2}R^zOR^x]$ and $[O_{1/2}R^zOR^{y*}]$ are bonded to one unit independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$;

with the proviso that the molar proportion of all radicals $R^y$ in the polymeric alkyl silicate is at most 50 mol %, preferably at most 25 mol %, based in each case on the molar amount of the sum of all radicals $R^x$, $R^y$ and $R^{y*}$, wherein the molar proportion for the radical $OR^y$ equal to hydrogen is at most 33 mol %, preferably at most 15 mol %, preferably at most 10 mol %, especially at most 9 mol %, based in each case on the molar amount of the sum of all radicals $OR^x$ and $OR^y$;

and with the proviso that the following polymeric alkyl silicates, consisting exclusively of compounds of formula II, are excluded:

(II)

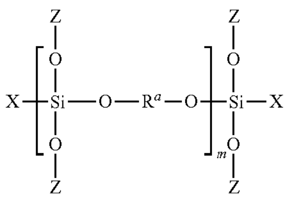

where

Z is a radical of formula $—Si(OR^b)_3$ or a radical of formula $—CR^c_3$, $R^a$ is each independently a divalent unsubstituted or substituted carbon-bonded radical or a divalent silicon-bonded radical, $R^b$ is each independently a monovalent unsubstituted or substituted hydrocarbon radical having 4 to 40 carbon atoms which is branched at the α-carbon atom or is doubly branched at the β-carbon atom, $R^c$ is each independently a monovalent unsubstituted or substituted hydrocarbon radical having 1 to 50 carbon atoms, preferably 1 to 10 carbon atoms, preferably 1 to 5 carbon atoms, X is a halogen atom, an oxygen-bonded unsubstituted or substituted $C_1$- to $C_{40}$-hydrocarbon radical, wherein individual carbon atoms may be replaced by oxygen atoms, a radical of formula —O—Si($OR^b$)$_3$ or a radical of formula —OSi$R''_3$, $R''$ is each independently a monovalent unsubstituted or substituted $C_1$- to $C_{40}$-hydrocarbon radical and m is an integer of at least 2, preferably at least 5 and at most 1000, by preference at most 500, preferably at most 100.

The organosilicon compounds preferably consist of 100% by weight of a mixture of polymeric alkyl silicates of the formula (I).

The invention therefore relates to a mixture of polymeric alkyl silicates of the formula (I)

$$[SiO_{4/2}]_a\ [(R^xO)SiO_{3/2}]_b\ [(R^yO\ SiO_{3/2}]_{b'}\ [(R^xO)_2SiO_{2/2}]_c\ [(R^xO)(R^yO)SiO_{2/2}]_{c'}\ [(R^yO)_2SiO_{2/2}]_{c''}\ [(R^xO)_3SiO_{1/2}]_d\ [(R^xO)_2(R^yO)SiO_{1/2}]_{d'}\ [(R^xO)(R^yO)_2SiO_{1/2}]_{d''}\ [R^yO)_3SiO_{1/2}]_{d'''},\ [O_{1/2}R^zO_{1/2}]_e\ [O_{1/2}R^zOH]_{e'}\ [O_{1/2}R^zOR^x]_{e''}\ [O_{1/2}R^zOR^{y*}]_{e'''} \quad (I)$$

wherein the indices a, b, b', c, c', c'', d, d', d'', d''', e', e'' and e''' are each independently a number in the range from 0 to 5000, preferably 0 to 500, preferably 0 to 20, the index e is a number in the range from 2 to 5000, preferably 2 to 500, preferably 2 to 100, especially 2 to 20, with the proviso that the sum of all indices is at least 5;

the radicals $R^x$ are each independently selected from radicals that satisfy at least one of the following conditions:

(a) $R^x$ is a radical of the formula —$CHR^p_2$ or —$CR^p_3$, wherein $R^p$ is each independently a monovalent unsubstituted or substituted hydrocarbon radical having 1 to 50 carbon atoms, (b) $R^x$ is a substituted or unsubstituted, $C_5$-$C_{20}$ hydrocarbon radical that is doubly branched at the β-carbon atom, (c) $R^x$ is an unsubstituted or alkyl-substituted cyclopentyl, cyclohexyl or cycloheptyl radical having a total of not more than 9 carbon atoms;

the radicals $R^y$ are each independently a hydrogen atom, a methyl, ethyl, n-propyl or n-butyl radical, preferably a methyl or ethyl radical;

in which the radicals $OR^y$ may be partially replaced by Si-bonded H atoms;

$R^{y*}$ is a methyl, ethyl, n-propyl or n-butyl radical, preferably a methyl or ethyl radical;

the radicals $R^z$ are each independently a divalent unsubstituted or substituted radical bonded via carbon or a divalent radical bonded via silicon, in which individual carbon or Si atoms may be replaced by oxygen atoms;

with the proviso that the units $[O_{1/2}R^zO_{1/2}]$ are bonded to two units independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$, $[(R^xO)_3SiO_{1/2}]$, $[(R^xO)_2(R^yO)SiO_{1/2}]$, $[(R^xO)(R^yO)_2SiO_{1/2}]$ and $[(R^yO)_3SiO_{1/2}]$;

with the proviso that the units $[O_{1/2}R^zOH]$, $[O_{1/2}R^zOR^x]$ and $[O_{1/2}R^zOR^{y*}]$ are bonded to one unit independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$;

with the proviso that the molar proportion of all radicals $R^y$ in the polymeric alkyl silicate is at most 50 mol %, preferably at most 25 mol %, based in each case on the molar amount of the sum of all radicals $R^x$, $R^y$ and $R^{y*}$, wherein the molar proportion for the radical $OR^y$ equal to hydrogen is at most 33 mol %, preferably at most 15 mol %, preferably at most 10 mol %, especially at most 9 mol %, based in each case on the molar amount of the sum of all radicals $OR^x$ and $OR^y$;

and with the proviso that the following polymeric alkyl silicates, consisting exclusively of compounds of formula II, are excluded:

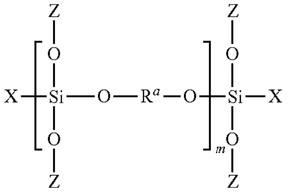

(II)

where

Z is a radical of formula —Si($OR^b$)$_3$ or a radical of formula —$CR^c_3$, $R^a$ is each independently a divalent unsubstituted or substituted carbon-bonded radical or a divalent silicon-bonded radical, $R^b$ is each independently a monovalent unsubstituted or substituted hydrocarbon radical having 4 to 40 carbon atoms which is branched at the x-carbon atom or is doubly branched at the β-carbon atom, $R^c$ is each independently a monovalent unsubstituted or substituted hydrocarbon radical having 1 to 50 carbon atoms, preferably 1 to 10 carbon atoms, preferably 1 to 5 carbon atoms, X is a halogen atom, an oxygen-bonded unsubstituted or substituted $C_1$- to $C_{40}$-hydrocarbon radical, wherein individual carbon atoms may be replaced by oxygen atoms, a radical of formula —O—Si($OR^b$)$_3$ or a radical of formula —OSi$R''_3$, $R''$ is each independently a monovalent unsubstituted or substituted $C_1$- to $C_{40}$-hydrocarbon radical and m is an integer of at least 2, preferably at least 5 and at most 1000, by preference at most 500, preferably at most 100.

The mixture of polymeric alkyl silicates preferably does not contain SiC-bonded radicals.

The term "doubly branched" means that there are three carbon radicals on a carbon atom.

The molar proportion of all radicals $R^y$ in the polymeric alkyl silicates is preferably at least 0 mol %, preferably at least 0.01 mol % and particularly preferably at least 0.1 mol %, based in each case on the molar amount of the sum of all radicals $R^x$, $R^y$ and $R^{y*}$.

The radicals $R^p$, $R^x$, $R^z$ may be acyclic, cyclic, saturated or mono- or polyunsaturated or aromatic.

The radicals $R^p$, $R^x$ and $R^z$ may also comprise the following substitutions:

vinyl radical, ethynyl radical, $—OR^1$, $—NR^1_2$, —SH, $—SR^1$, epoxy group, $COOR^1$, —CHO, —CN, $—OCOOR^2$, $—NR^1—COOR^1$, $—NR^1—CO—NR^1$, $—SiR^1_3$ and $—OSiR_3{}^1$, where $R^1$ represents a hydrogen atom or a monovalent $C_1$- to $C_{18}$-hydrocarbon radical and $R^2$ represents a monovalent $C_1$- to $C_{18}$-hydrocarbon radical.

The radical $R^x$ is preferably a radical of the formula $—CHR^p_2$ or $—CR^p_3$, where $R^p$ is each independently a monovalent unsubstituted or substituted hydrocarbon radical having 1 to 50 carbon atoms, preferably 1 to 10 carbon atoms, preferably 1 to 6 carbon atoms.

Preferred examples of radicals $R^x$ are the tert-butyl, 2-butyl radical, 3-methyl-2-butyl, 3-methyl-2-pentyl, 3-pentyl radical, 2-hexyl radical, 3-hexyl radical, 2-heptyl radical, 2-octyl radical, 1-phenylethyl radical, the 1-phenyl-1-propyl radical, 2,2-dimethyl-1-propyl radical and 1,1-dimethylpropyl radical.

Examples of substituted radicals $R^x$ are $—C(CH_3)_2—CH_2—NH_2$, $—CH(CH_3)—CH_2—NH_2$, $—CH(C_2H_5)—CH_2—NH_2$, $—C(CH_3)_2—CH_2—NH—CH_2—CH_2—NH_2$, $—CH(CH_3)—CH_2—NH—CH_2—CH_2—NH_2$, $—CH(C_2H_5)—CH_2—NH—CH_2—CH_2—NH_2$, $—C(CH_3)_2—CH═CH_2$, $—CH(CH_3)—CH═CH_2$, $—CH(C_2H_5)—CH═CH_2$, $—C(CH_3)_2—C≡CH$, $—CH(CH_3)—C≡CH$ and $—CH(C_2H_5)—C≡CH$.

$R^z$ is preferably each independently a divalent hydrocarbon radical having 3 to 200 carbon atoms, preferably having 3 to 50 carbon atoms, wherein the carbon atoms may be replaced by oxygen atoms or by siloxanyl radicals of formula $—(R^3_2SiO)_o—SiR^3_2—$, wherein $R^3$ is each independently a $C_1$- to $C_{20}$-hydrocarbon radical, preferably a $C_1$- to $C_6$-hydrocarbon radical, and is an integer from 0 to 100, preferably 1 to 20.

Examples of radicals $R^z$ are the 1,3-propylene, 1,4-butylene, 1,2-cyclohexylidene, 1,3-cyclohexylidene, 1,4-cyclohexylidene, 1,2-phenylene, 1,3-phenylene and 1,4-phenylene radical and also radicals of the formulae $CR^4_2—CR^4_2—(OCR^4_2—CR^4_2)_p—$, $CR^4_2—(CR^4_2)_q—(OCR^4_2—(CR^4_2)_q)_p—$, $(Me_2SiO)_o$-$Me_2Si—$, $CH_2—CH_2—CH_2$-$(Me_2SiO)_o$-$Me_2Si—CH_2—CH_2—CH_2—$, $CH_2—CH_2$-$(Me_2SiO)_o$-$Me_2Si—CH_2—CH_2—$ and $CH_2$-$(Me_2SiO)_o$-$Me_2Si—CH_2—$, where Me is a methyl radical $R^4$ may be the same or different and is a hydrogen atom or a $C_1$- to $C_{18}$-hydrocarbon radical, preferably a hydrogen atom or a methyl radical, is an integer from 0 to 100, preferably 1 to 20, p is an integer from 0 to 100, preferably 1 to 20, and q is an integer from 1 to 100, preferably 1 to 50.

Preferred examples of radicals $R^z$ are radicals of the formula $—CH(CH_3)—CH_2—O—CH_2—CH(CH_3)—$, $—CH_2—CH(CH_3)—O—CH(CH_3)—CH_2—$, $—CH(CH_3)—CH_2—O—CH(CH_3)—CH_2—$ and $—CH_2—CH_2—O—CH_2—CH_2—$.

In the mixture of polymeric alkyl silicates according to the invention, the polymeric alkyl silicates comprise at least 2, preferably at least 3, preferably at least 4 structural elements selected from the group of the formulae 1 to 10

(Formula 1)

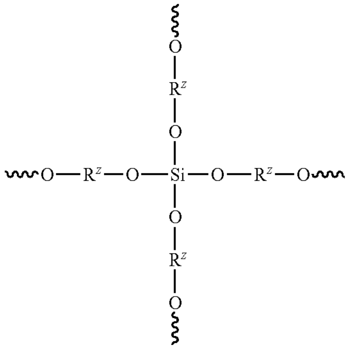

(Formula 2)

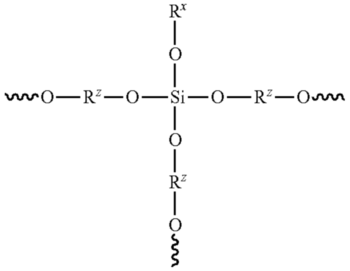

(Formula 3)

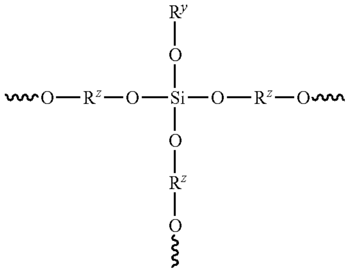

(Formula 4)

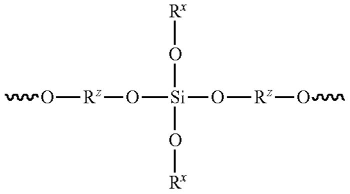

(Formula 5)

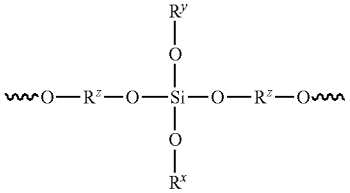

(Formula 6)

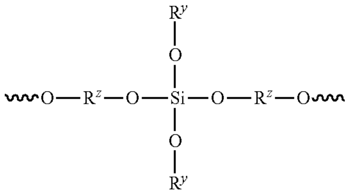

-continued (Formula 7)

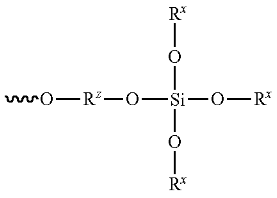

(Formula 8)

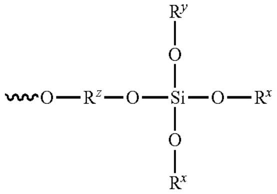

(Formula 9)

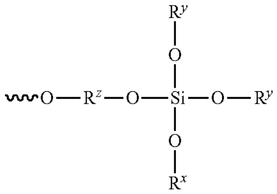

(Formula 10)

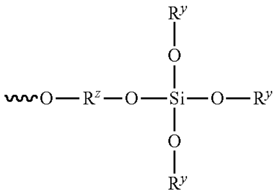

with the proviso that the sum of the number of structural units of the formulae 1+2+3+5+6 is less than 60%, preferably less than 50%, preferably less than 35% and particularly preferably less than 20% and preferably at least 0.1%, preferably at least 0.5%, particularly at least 1%, particularly preferably at least 5% and especially preferably at least 10%, based in each case on the sum of the number of all structural units, and with the proviso that if a structural unit of formula 4 is present where $R^x$ has the definition of —$CR^p_3$, at least one further structural unit selected from the group of formulae 1, 2, 3, 5, 6, 9 and 10 is present, where $R^p$, $R^x$, $R^y$ and $R^z$ have the definition stated therefor above.

The polymeric alkyl silicates may also contain structural elements selected from the group of the formulae 11 to 15, Formulae (Formula 11)

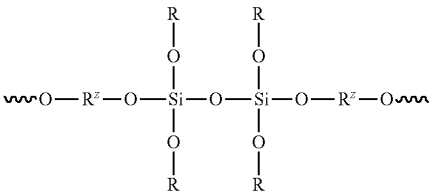

-continued (Formula 12)

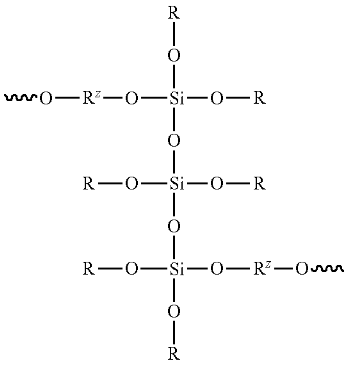

(Formula 13)

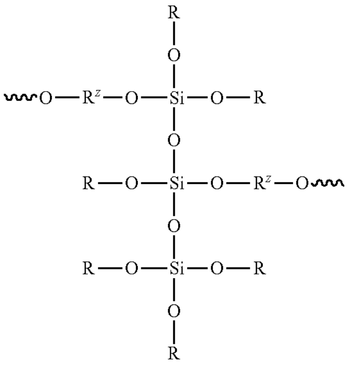

(Formula 14)

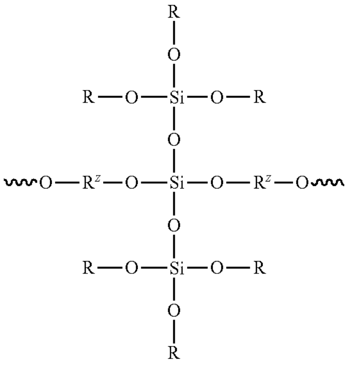

(Formula 15)

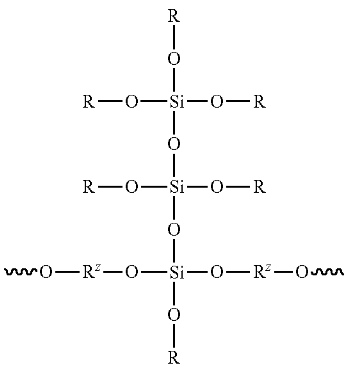

with the proviso that the radical R is independently selected from radicals of $R^x$ and $R^y$, and with the proviso that if the structural unit of the formula 14 is present and R is a radical of the formula —$CR^p_3$, at least one further structural unit of the formulae 11, 12, 13 or 15 must be present, where $R^p$, $R^x$ and $R^y$ each have the definition specified above.

The invention also relates to a process for preparing the mixture of polymeric alkyl silicates of the formula (I) by reacting silanes (1), selected from the group of tetrachlorosilane (1a), tetraalkoxysilane (1b), partial hydrolysates of tetrachlorosilane, partial hydrolysates of tetraalkoxysilane and mixtures thereof, optionally with the addition of solvents (7), with monohydroxy compounds (2) of formula $$HO—R^x,$$

optionally with the addition of primary alcohols (3) of the formula $$HO—R^y$$

and/or optionally with the addition of water (4), and with dihydroxy compounds (5) of formula $$HO—R^z—OH$$

or salts thereof, optionally in the presence of catalysts (6), simultaneously in one step or successively in two steps, preferably successively in two steps, with the proviso that if $SiCl_4$ (1a) is reacted with monohydroxy compounds (2) of the formula HO—$R^x$, in which $R^x$ is a radical of the formula —$CR^p_3$, at least one further compound selected from the group consisting of monohydroxy compounds (2) of the formula HO—$R^x$, in which $R^x$ has the definition stated above, but is not a radical of the formula —$CR^p_3$, primary alcohols (3) of the formula HO—$R^y$, water (4) and mixtures thereof are added to the reaction mixture, and with the proviso that monohydroxy compounds (2) and primary alcohols (3) are used in amounts of 1.0 to 3.0 mol, preferably 1.5 to 2.5 mol per mole of silane (1), and dihydroxy compounds (5) are used in amounts of 0.7 to 1.5 mol, preferably 0.9 to 1.1 mol per mole of silane (1), wherein $R^p$, $R^x$, $R^y$ and $R^z$ have the definition stated above.

Preference is given to a process for preparing the mixture of polymeric alkyl silicates of the formula (I) by reacting silanes (1), selected from the group of tetrachlorosilane (1a), tetraalkoxysilane (1b), partial hydrolysates of tetrachlorosilane, partial hydrolysates of tetraalkoxysilane and mixtures thereof, optionally with the addition of solvents (7), with secondary alcohols (2a) or tertiary alcohols (2b) of the formula $$HO—R^x,$$

wherein $R^x$ is a radical of the formula —$CHR^p_2$ or —$CR^p_3$, optionally with the addition of primary alcohols (3) of the formula $$HO—R^y$$

and/or optionally with the addition of water (4), and with dihydroxy compounds (5) of formula $$HO—R^z—OH$$

or salts thereof, optionally in the presence of catalysts (6), simultaneously in one step or successively in two steps, with the proviso that if $SiCl_4$ (1a) is reacted with a tertiary alcohol (2b) HO—$R^x$, wherein $R^x$ is a radical of the formula —$CR^p_3$, at least one further compound selected from the group consisting of secondary alcohols (2a) HO—$R^x$, where $R^x$ is a radical of the formula —$CHR^p_2$, primary alcohols (3) HO—$R^y$, water (4) and mixtures thereof are added to the reaction mixture, and with the proviso that alcohols of the formulae HO—$R^x$ and HO—$R^y$ are used in amounts of 1.0 to 3.0 mol, preferably 1.5 to 2.5 mol per mole of silane (1), and dihydroxy compounds (5) are used in amounts of 0.7 to 1.5 mol, preferably 0.9 to 1.1 mol per mole of silane (1), wherein $R^p$, $R^x$, $R^y$ and $R^z$ have the definition stated above.

Particular preference is given to a process for preparing the mixture of polymeric alkyl silicates of the formula (I) by reacting in a first step, silanes (1), selected from the group of tetrachlorosilane (1a), tetraalkoxysilane (1b), partial hydrolysates of tetrachlorosilane, partial hydrolysates of tetraalkoxysilane and mixtures thereof, optionally with the addition of solvents (7), with secondary alcohols (2a) or tertiary alcohols (2b) of the formula $$HO—R^x,$$

wherein $R^x$ is a radical of the formula —$CHR^p_2$ or —$CR^p_3$, optionally with the addition of primary alcohols (3) of the formula $$HO—R^y$$

optionally with the addition of water (4), and in a second step, the reaction mixtures obtained from the first step are reacted with dihydroxy compounds (5) of formula $$HO—R^z—OH$$

or salts thereof, optionally in the presence of catalysts (6) and optionally with the addition of solvents (7), with the proviso that if $SiCl_4$ (1a) is reacted with a tertiary alcohol (2b) HO—$R^x$, wherein $R^x$ is a radical of the formula —$CR^p_3$, at least one further compound selected from the group consisting of secondary alcohols (2a) HO—$R^x$, where $R^x$ is a radical of the formula —$CHR^p_2$, primary alcohols (3) HO—$R^y$, water (4) and mixtures thereof are added to the reaction mixture, and with the proviso that alcohols of the formulae HO—$R^x$ and HO—$R^y$ are used in amounts of 1.0 to 3.0 mol, preferably 1.5 to 2.5 mol per mole of silane (1), and dihydroxy compounds (5) are used in amounts of 0.7 to 1.5 mol, preferably 0.9 to 1.1 mol per mole of silane (1), wherein $R^p$, $R^x$, $R^y$ and $R^z$ have the definition stated therefor in claim 1.

The process according to the invention is preferably carried out in two steps. In this case, in a first step, the silane (1), such as tetrachlorosilane (1a), is preferably initially charged and the monohydroxy compound (2), optionally primary alcohol (3) and optionally water (4) are added. The hydrogen chloride formed when using tetrachlorosilane is discharged. In a second step, preferably the silane mixture from the first step, such as a chloroalkoxysilane mixture, is initially charged, optionally diluted with solvent (7), and dihydroxy compound (5) and optionally catalyst (6) are added. The resulting hydrogen chloride is discharged.

The hydrogen chloride formed is preferably discharged with the aid of a stream of inert gas, such as argon, passed through during the reaction.

After the reaction at the end of the second step, any solvent (7) that may have been used is removed, preferably by distillation.

Preferably nitrogen bases are used as catalysts (6) in the process according to the invention, preferably such nitrogen bases selected from the group consisting of pyridine, ammonia, urea, ethylenediamine, triethylamine, tributylamine and mixtures thereof.

Catalysts (6) are preferably used in the process according to the invention in amounts of 1 to 70% by weight, preferably 5 to 55% by weight, based in each case on the total weight of components (1) to (5).

The process according to the invention may be carried out in the presence of one or more solvents.

If solvents (7) are used in the process according to the invention, said solvents are preferably used in the second process step.

Examples of solvents (7) are hydrocarbons such as toluene, hexane, isohexane, pentane, ethers such as methyl tert-butyl ether and siloxanes such as hexamethyldisiloxane, octamethyltrisiloxane and $(MesSiO)_4Si$(where Me=methyl radical). Solvents (7) are preferably used in amounts of 10 to 200% by weight, preferably 5 to 100% by weight, based in each case on the total weight of components (1) to (5).

Solvents (7) are preferably removed after the reaction at the end of the process. They are preferably removed by distillation.

The silanes (1) used are preferably tetrachlorosilane, tetraethoxysilane and partial hydrolysates thereof. Preference is given to using tetrachlorosilane (1a).

Preferred examples of secondary alcohols (2a) are 2-butanol and isopropanol.

A preferred example of tertiary alcohols (2b) is tert-butanol.

A preferred example of primary alcohols (3) is methanol.

Examples of dihydroxy compounds (5) are ethylene glycol, propylene glycol, 1,3-propanediol, 1,4-butanediol, 2,4-pentanediol, 1,2-cyclohexanediol, 1,3-cyclohexanediol, 1,4-cyclohexanediol, 1,2-dihydroxybenzene, 1,3-dihydroxybenzene, 1,4-dihydroxybenzene, diethylene glycol, dipropylene glycol, polyethylene glycol, polypropylene glycol, HO-$(Me_2SiO)_o$-$Me_2Si$—OH, HO—$CH_2$—$CH_2$—$CH_2$-$(Me_2SiO)_o$-$Me_2Si$—$CH_2$—$CH_2$—$CH_2$—OH, where o is an integer from 1 to 20 and Me is a methyl radical.

Preferred examples of dihydroxy compounds (5) are diethylene glycol and dipropylene glycol.

The process according to the invention can be carried out batchwise, semi-continuously or continuously.

The process according to the invention is carried out at a temperature of preferably 20° C. to 200° C., preferably 60° C. to 160° C. It may be carried out at the pressure of the surrounding atmosphere (ca. 1020 hPa) or at higher or lower pressures. It is preferably carried out at the pressure of the surrounding atmosphere.

The mixture of polymeric alkyl silicates of formula (I) may also comprise polymeric alkyl silicates with Si-bonded hydrogen.

The invention therefore relates to a further process for preparing a mixture of polymeric alkyl silicates of the formula (I) by reacting compounds of the formula $Si(H)_l(OR^x)_k(OR^y)_j$ and/or partial hydrolysates thereof, where the index l is 1, 2, 3 or 4, preferably 1 or 2, and the indices k and j are each independently 0, 1, 2 or 3, with the proviso that the sum of l+k+j equals 4, with dihydroxy compounds (5) of formula $$HO—R^z—OH$$

optionally in the presence of a catalyst (6) and optionally with the addition of a solvent (7)

with elimination of hydrogen, where $R^x$, $R^y$ and $R^x$ have the definition stated above.

The polymeric alkyl silicates according to the invention may be subjected to further processing, for example by crosslinking to afford elastomers, and employed where silicones are employed, for example in the sectors of hydrophobization, antifoam, textiles, cosmetics, buildings preservation and personal and household care.

Examples 1 to 12 and Comparative Example

Measurement Methods

1) The viscosity was measured at 25° C. using a Stabinger SVM3000 rotational viscometer from Anton Paar.

2) The mass-average molar mass $M_w$ and also the number-average molar masses $M_n$ can be determined by size exclusion chromatography (SEC) against polydimethylsiloxane standards, in toluene, at 35° C., flow rate 0.7 ml/min and detection by RI (refractive index detector) on a MesoPore-OligoPore column set (Agilent, Germany) with an injection volume of 10 μl.

3) The conversion of the examples listed below were checked by means of nuclear magnetic resonance spectroscopy ($^{29}Si$ NMR; Bruker Avance III HD 500 ($^{29}Si$: 99.4 MHz) spectrometer with BBO 500 MHz S2 probe head; inverse gated pulse sequence (NS=3000). 150 mg of the samples were taken up in 500 μl of a 4*10-2 molar solution of $Cr(acac)_3$ in $CD_2Cl_2$. When using secondary alcohols, mixtures of chloroalkoxysilanes comprising $Si(Cl)_3(OR)$, $Si(Cl)_2(OR)_2$, $Si(Cl)(OR)_3$ and $Si(OR)_4$ are formed. An average empirical formula can be calculated from the signal intensities by multiplying the relative signal intensities of the individual chloroalkoxysilanes by the Cl/Si or OR/Si ratio present in the respective chloroalkoxysilanes and averaging over the four species, as demonstrated in the examples 1-4 below.

4) To identify individual molecules and the structural motifs they contain, the material from example 6 was analyzed using MALDI-TOF. MALDI-TOF measurements were carried out with a Bruker Autoflex Speed MALDI-TOF/TOF mass spectrometer. The measurement was linear in the positive mode with a Nd:YAG laser at 355 nm. The mass range detected for the positive mode was m/z 500-5000. The calibration in this mass range was carried out with polyethylene glycol.

THAP (2',4',6'-trihydroxyacetophenone, 5 mg/mL dissolved in 70% acetonitrile, 30% water, 0.1% formic acid) was used as matrix and mixed with 5 mg of the sample. NaI (5 mg/mL) and KI (5 mg/mL) dissolved in methanol were added for ionization. The sample was applied using the thin-film technique. See the structural motifs from MALDI-TOF studies on the product of Example 6.

TABLE 1

Composition and average empirical formula of the reaction product according to Examples 1, 2 and Comparative example

| Alkoxychlorosilane | Example 1 Content [%] | Example 2 Content [%] | Comparative example Content [%] |
|---|---|---|---|
| $Si(Cl)_3(OR)$ | 15.8 | 12.0 | 0.0 |
| $Si(Cl)_2(OR)_2$ | 65.7 | 58.8 | 100 |
| $Si(Cl)(OR)_3$ | 18.2 | 28.8 | 0.0 |
| $Si(OR)_4$ | 0.3 | 0.4 | 0.0 |
| Average empirical formula | Si(Cl)1.97(O-2-Bu)$_{2.03}$ | $Si(Cl)_{1.82}$(O-2-Pr)$_{2.18}$ | $Si(Cl)_{2.00}$(O-tBu)$_{2.00}$ |

When using a mixture of different alcohols—as in Example 3—mixed chloroalkoxysilanes are obtained, for example, in addition to $Si(Cl)_3$(O-2-Bu) also $Si(Cl)_3$(O-Me)—analogous permutations are observed for the other chloroalkoxysilanes. To calculate the average empirical formula, the signal intensities of the respective groups (monoalkoxytrichlorosilanes, dialkoxydichlorosilanes, trialkoxychlorosilanes and tetraalkoxysilanes) are added and then offset against each other in the same way as in the example shown above. In contrast, the reaction of tetrachlorosilane with two equivalents of a tertiary alcohol (e.g. tert-butanol) results in the formation of a single compound, the dialkoxydichlorosilane.

TABLE 2

Composition and average empirical formula of the reaction product according to Examples 3-5.

| Alkoxychlorosilane* | Example 3 Content [%] | Example 4 Content [%] | Example 5 Content [%] |
|---|---|---|---|
| $Si(Cl)_3(OR^1)$ | 3.19 | — | — |
| $Si(Cl)_3(OR^2)$ | 18.52 | 12.98 | — |
| $Si(Cl)_2(OR^1)_2$ | 6.50 | — | — |
| $Si(Cl)_2(OR^1)(OR^2)$ | 21.57 | 5.65 | 1.5 |
| $Si(Cl)_2(OR^2)_2$ | 7.91 | 50.61 | 97.2 |
| $Si(Cl)(OR^1)_3$ | 4.01 | — | 2.0 |
| $Si(Cl)(OR^1)_2(OR^2)$ | 19.34 | — | — |
| $Si(Cl)(OR^1)(OR^2)_2$ | 17.24 | 14.66 | — |
| $Si(Cl)(OR^2)_3$ | 1.13 | 14.79 | — |
| $Si(OR^1)_4$ | — | — | 1.0 |
| $Si(OR^1)_3(OR^2)$ | — | — | — |
| $Si(OR^1)_2(OR^2)_2$ | 0.19 | 0.47 | — |
| $Si(OR^1)(OR^2)_3$ | 0.25 | 0.56 | — |
| $Si(OR^2)_4$ | 0.15 | 0.27 | — |
| Average empirical formula | $Si(Cl)_{1.79}(OR)_{2.21}$ (43.2% OMe) | $Si(Cl)_{1.81}(OR)_{2.19}$ (10.58% OMe) | $Si(Cl)_{1.98}(OR)_{2.02}$ (5.54% OMe) |

*$OR^1$ describes the methoxy radical, depending on the example, $OR^2$ describes in these examples either the 2-Bu-O or tert-butoxy radical.

General Set-Up of the Apparatus for the Alkoxylation of Tetrachlorosilane to Produce the Chloroalkoxysilanes (CAS) of Examples 1-5 and the Comparative Example A 4 L three-necked flask is equipped with a KPG stirrer, a 1 L non-pressure equalizing dropping funnel (fitted with an olive) and an olive. The flask is connected via the olive to an empty safety wash bottle and a downstream exhaust gas scrubber filled with NaOH. The entire apparatus is carried out in a fume hood with a neutralization system and flushed with argon before filling (the argon is added via the dropping funnel) and the reaction flask is cooled to 0° C. The tetrachlorosilane is initially charged and the appropriate alcohol (or previously prepared mixtures of alcohols) are slowly added via the dropping funnel. During the addition, a constant stream of argon is passed through the system to remove the resulting hydrogen chloride gas from the gas phase. The mixture is then warmed to room temperature and stirred at this temperature for two hours.

When using tert-butanol, the solid is first dissolved in toluene (1 part by weight of tert-butanol to 2 parts by weight of toluene).

General Set-Up of the Apparatus for Reacting the Chloroalkoxysilanes (CAS) with Organic Diols According to Examples 6 to 12

A 2 L three-necked flask is equipped with a KPG stirrer, a 1 L pressure-equalizing dropping funnel (fitted with an olive), and a reflux condenser with olive. The apparatus is connected via the olive to an empty safety wash bottle and a downstream exhaust gas scrubber filled with NaOH. The entire apparatus is carried out in a fume hood with a neutralization system and flushed with argon before filling (the argon is added via the dropping funnel). The chloroalkoxysilane mixture is initially charged and diluted with toluene. A mixture of the selected diol and pyridine is slowly added via the dropping funnel (the reaction flask is first heated to the temperature given in Table 3, depending on the example). During the addition, a constant stream of argon is passed through the system to remove the resulting hydrogen chloride gas from the gas phase. After the addition is complete, the mixture is stirred at the reaction temperature for two hours at unchanged flow of argon, brought to room temperature and filtered through a pleated filter. The adhering toluene is removed on a rotary evaporator at 60° C. and 100 mbar.

A summary of the reactants used in the examples and weights thereof for producing the chloroalkoxysilanes (CAS) are given in Table 3.

TABLE 3

Weights, addition rates and average empirical formulae of the reactions of tetrachlorosilane with various alcohols or mixtures.

| Examples* | Weight of $SiCl_4$ [g] | Alcohol/ Weight [g] | Duration of addition [Hours] | Average empirical formula |
|---|---|---|---|---|
| Example 1 | 1600 | 2-Butanol/1310 | 6.0 | $Si(Cl)_{1.97}(OR)_{2.03}$ |
| Example 2 | 600 | Isopropanol/425 | 2.5 | $Si(Cl)_{1.82}(OR)_{2.18}$ |
| Example 3 | 401 | 2-Butanol/175 Methanol/76 | 2.0 | $Si(Cl)_{1.79}(OR)_{2.21}$ |
| Example 4 | 401 | 2-Butanol/314 Methanol/15 | 2.0 | $Si(Cl)_{1.81}(OR)_{2.19}$ |
| Example 5 | 401 | Tert-butanol/341 Methanol/5 | 2.0 | $Si(Cl)_{1.96}(OR)_{2.04}$ |
| Comparative Example | 21 | Tert-butanol/19 | 0.5 | $Si(Cl)_{2.00}(OR)_{2.00}$ |

*For Examples 1-4, the formation of trichloroalkoxysilanes, dichlorodialkoxysilanes, chlorotrialkoxysilanes and tetraalkoxysilanes is observed. In Examples 3 and 4, the alcohols were mixed prior to addition via the dropping funnel. In contrast, the comparative example shows only a singlet of the dichlorodialkoxysilane. Examples 2-5 were carried out in 2 L three-necked flasks and the comparative example in a 100 mL three-necked flask.

The weights for the further reactions of the chloroalkoxysilanes (CAS) with organic diols are shown in Table 4.

TABLE 4

Weights and reaction temperatures of the reactions of chloroalkoxysilanes with organic diols.

| Examples | Diol/ Weight [g] | CAS/ Weight [g] | Weight of pyridine [g] | Volume of toluene [ml] | Temp. [° C.] |
|---|---|---|---|---|---|
| Example 6 | DPG/ 70.815 | Example 1/ 130.001 | 83.953 | 400 | 20 |
| Example 7 | DPG/ 70.814 | Example 1/ 129.980 | 83.968 | 430 | 60 |
| Example 8 | DPG/ 70.818 | Example 1/ 130.007 | 84.030 | 300 | 150 |
| Example 9 | DPG/ 74.147 | Example 2/ 130.007 | 94.900 | 300 | 20 |
| Example 10 | DPG/ 84.280 | Example 3/ 135.000 | 105.120 | 300 | 20 |
| Example 11 | DEG/ 68.22 | Example 4/ 150.000 | 96.957 | 350 | 20 |
| Example 12 | DPG/ 68.22 | Example 5/ 150.001 | 96.967 | 350 | 20 |

* DPG = dipropylene glycol, DEG = diethylene glycol.

The analytical data collected for the products of Examples 6 to 12 are summarized in Table 5.

TABLE 5

Analytical data of the products of Examples 6-12.

| Examples | Viscosity [mPa*s] | GPC $M_N$ | $M_W$ | PD |
|---|---|---|---|---|
| Example 6* | 16801 (5/s) 3637 (150/s) | 1397 | 829242 | 593.7 |
| Example 7* | 1508 (5/s) 877 (150/s) | 1002 | 170627 | 170.3 |
| Example 8 | 151.8 | 800 | 56956 | 71.2 |
| Example 9 | 44.3 | 799 | 8175 | 10.2 |
| Example 10 | 42.0 | 642 | 5965 | 9.3 |
| Example 11 | 39.4 | 782 | 7347 | 9.4 |
| Example 12 | 41.2 | 754 | 6598 | 8.8 |

*The materials from examples 6 and 7 show thixotropic behavior. In both cases, the viscosities are given at defined shear rates (5 revolutions/s and 150 revolutions/s).

Based on MALDI-TOF investigations on the product of Example 6, the following molecules could be identified as part of the mixture:

A

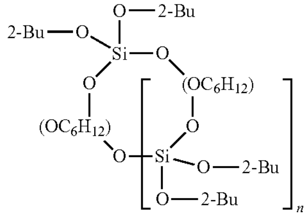

B

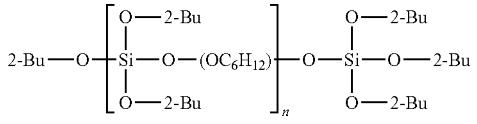

-continued

C

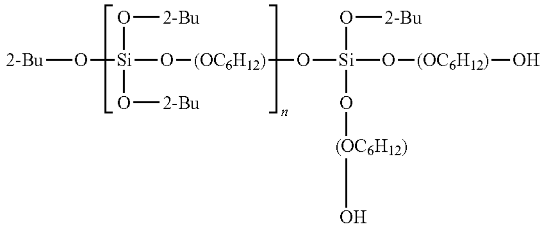

D

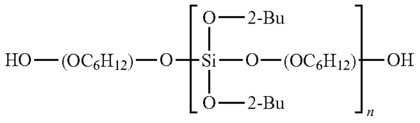

E

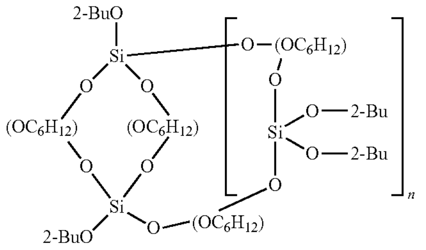

F

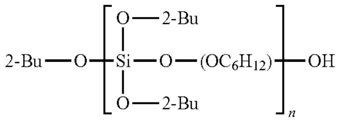

Molecules detected by MALDI-TOF. The following indices could be established for the respective compounds. The indices of the compounds A, B, C, D and F could be detected from n=1-11, and for the index E from n=0-2. For compound E, the repeat units could also be present distributed among the other DPG units.

The invention claimed is:

1. An organosilicon compound comprising a mixture of polymeric alkyl silicates, comprising at least 90% by weight of a mixture of polymeric alkyl silicates of the formula (I)

$$[SiO_{4/2}]_a [(R^xO)SiO_{3/2}]_b [(R^yO)SiO_{3/2}]_{b'} [(R^xO)_2SiO_{2/2}]_c [(R^xO)(R^yO)SiO_{2/2}]_{c'} [(R^yO)_2SiO_{2/2}]_{c''} [(R^xO)_3SiO_{1/2}]_d [(R^xO)_2(R^yO)SiO_{1/2}]_{d'} [(R^xO)(R^yO)_2SiO_{1/2}]_{d''} [(R^yO)_3SiO_{1/2}]_{d'''} [O_{1/2}R^zO_{1/2})_e [O_{1/2}R^zOH]_{e'} [O_{1/2}R^zOR^x)_{e''} [O_{1/2}R^zOR^{y*}]_{e'''}, \quad (I)$$

wherein the indices a, b, b', c, c', c'', d, d', d'', d''', e', e'' and e''' independently of one another indicate a number in the range from 0 to 5000, where the index e is a number in the range of 2 to 5000, with the proviso that the sum of all indices is at least 5;

the radicals $R^x$ are each independently selected from radicals that satisfy at least one of the following conditions:

(a) $R^x$ is a radical of the formula $—CHR^p_2$ or $—CR^p_3$, wherein $R^p$ is each independently a monovalent unsubstituted or substituted hydrocarbon radical having 1 to 50 carbon atoms, (b) $R^x$ is a substituted or unsubstituted, $C_5$-$C_{20}$ hydrocarbon radical that is doubly branched at the β-carbon atom, (c) $R^x$ is an unsubstituted or alkyl-substituted cyclopentyl, cyclohexyl or cycloheptyl radical having a total of not more than 9 carbon atoms;

the radicals $R^y$ are each independently a hydrogen atom, a methyl, ethyl, n-propyl or n-butyl radical;

in which the radicals $OR^y$ may be partially replaced by Si-bonded H atoms;

$R^{y*}$ is a methyl, ethyl, n-propyl or n-butyl radical;

the radicals $R^z$ are each independently a divalent unsubstituted or substituted radical bonded via carbon or a divalent radical bonded via silicon, in which individual carbon or Si atoms may be replaced by oxygen atoms;

with the proviso that the units $[O_{1/2}R^zO_{1/2}]$ are bonded to two units independently selected from the group of units comprising $[SiO_{4/2}]$, $[(R^xO)SiO_{3/2}]$, $[(R^yO)SiO_{3/2}]$, $[(R^xO)\ 2SiO_{2/2}]$, $[(R^xO)\ (R^yO)SiO_{2/2}]$, $[(R^yO)\ 2SiO_{2/2}]$, $[(R^xO)_3SiO_{1/2}]$, $[(R^xO)\ 2\ (R^yO)SiO_{1/2}]$, $[(R^xO)\ (R^yO)\ 2SiO_{1/2}]$ and $[(R^yO)\ 3\ SiO_{1/2}]$;

with the proviso that the units $[O_{1/2}R^ZOH]$, $[O_{1/2}R^ZOR^X]$ and $[O_{12}R^zOR^{y*}]$ are bonded to one unit independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$;

with the proviso that the molar proportion of all radicals $R^y$ in the polymeric alkyl silicate is at most 50 mol %, based on the molar amount of the sum of all radicals $R^x$, $R^y$ and $R^{y*}$, wherein the molar fraction for the radical $OR^y$ equal to hydrogen is at most 33 mol %, based on the molar amount of the sum of all radicals $OR^x$ and $OR^y$;

and with the proviso that the following polymeric alkyl silicates, consisting exclusively of compounds of formula II, are excluded:

(II)

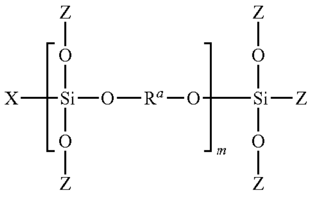

wherein

Z is a radical of formula $—Si(OR^b)_3$ or a radical of formula $—CR^c_3$, $R^a$ is each independently a divalent unsubstituted or substituted carbon-bonded radical or a divalent silicon-bonded radical, $R^b$ is each independently a monovalent unsubstituted or substituted hydrocarbon radical having 4 to 40 carbon atoms which is branched at the α-carbon atom or is doubly branched at the β-carbon atom, $R^c$ is each independently a monovalent unsubstituted or substituted hydrocarbon radical having 1 to 50 carbon atoms, X is a halogen atom, an oxygen-bonded unsubstituted or substituted $C_1$- to $C_{40}$-hydrocarbon radical, wherein individual carbon atoms may be replaced by oxygen atoms, a radical of formula $—O—Si(OR^b)_3$ or a radical of formula $—OSiR''_3$, $R''$ is each independently a monovalent unsubstituted or substituted $C_1$- to $C_{40}$-hydrocarbon radical and m is an integer of at least 2 and at most 1000.

2. A mixture of polymeric alkyl silicates of the formula (I)

$$[SiO_{4/2}]_a\ [(R^xO)SiO_{3/2}]_b\ [(R^yO)SiO_{3/2}]_{b'}\ [(R^xO)_2SiO_{2/2}]_c\ [(R^xO)(R^yO)SiO_{2/2}]_{c'}\ [(R^yO)_2SiO_{2/2}]_{c''}\ [(R^xO)_3SiO_{1/2}]_d\ [(R^xO)_2(R^yO)SiO_{1/2}]_{d'}\ [(R^xO)(R^yO)_2SiO_{1/2}]_{d''}\ [(R^yO)_3SiO_{1/2}]_{d'''}\ [O_{1/2}R^zO_{1/2})_e\ [O_{1/2}R^zOH]_{e'}\ [O_{1/2}R^zOR^x)_{e''}\ [O_{1/2}R^zOR^{y*}]_{e'''}, \quad (I)$$

wherein the indices a, b, b', c, c', c", d, d', d", d'", e', e" and e'" independently of one another indicate a number in the range from 0 to 5000, where the index e is a number in the range of 2 to 5000, with the proviso that the sum of all indices is at least 5;

the radicals $R^x$ are each independently selected from radicals that satisfy at least one of the following conditions:

(a) $R^x$ is a radical of the formula —$CHR^p_2$ or —$CR^p_3$, wherein $R^p$ is each independently a monovalent unsubstituted or substituted hydrocarbon radical having 1 to 50 carbon atoms, (b) $R^x$ is a substituted or unsubstituted, $C_5$-$C_{20}$ hydrocarbon radical that is doubly branched at the β-carbon atom, (c) $R^x$ is an unsubstituted or alkyl-substituted cyclopentyl, cyclohexyl or cycloheptyl radical having a total of not more than 9 carbon atoms;

the radicals $R^y$ are each independently a hydrogen atom, a methyl, ethyl, n-propyl or n-butyl radical;

in which the radicals $OR^y$ may be partially replaced by Si-bonded H atoms;

$R^{y}$* is a methyl, ethyl, n-propyl or n-butyl radical;

the radicals $R^z$ are each independently a divalent unsubstituted or substituted radical bonded via carbon or a divalent radical bonded via silicon, in which individual carbon or Si atoms may be replaced by oxygen atoms;

with the proviso that the units $[O_{1/2}R^zO_{1/2}]$ are bonded to two units independently selected from the group of units comprising $[SiO_{4/2}]$, $[(R^xO)SiO_{3/2}]$, $[(R^yO)SiO_{3/2}]$, $[(R^xO)\ 2SiO_{2/2}]$, $[(R^xO)\ (R^yO)SiO_{2/2}]$, $[(R^yO)\ 2SiO_{2/2}]$, $[(R^xO)_3SiO_{1/2}]$, $[(R^xO)_2(R^yO)SiO_{1/2}]$, $[(R^xO)\ (R^yO)\ 2SiO_{1/2}]$ and $[(R^yO)\ 3\ SiO_{1/2}]$;

with the proviso that the units $[O_{1/2}R^ZOH]$, $[O_{1/2}R^ZOR^X]$ and $[O_{1/2}R^zOR^y]$ are bonded to one unit independently selected from the group of units comprising $[SiO_{4/2}]$, $[(R^xO)SiO_{3/2}]$, $[(R^yO)SiO_{3/2}]$, $[(R^xO)_2SiO_{2/2}]$, $[(R^xO)(R^yO)SiO_{2/2}]$, $[(R^yO)_2SiO_{2/2}]$;

with the proviso that the molar proportion of all radicals $R^y$ in the polymeric alkyl silicate is at most 50 mol %, based on the molar amount of the sum of all radicals $R^x$, $R^y$ and $R^{y}$*, wherein the molar fraction for the radical $OR^y$ equal to hydrogen is at most 33 mol %, based on the molar amount of the sum of all radicals $OR^x$ and $OR^y$;

and with the proviso that the following polymeric alkyl silicates, consisting exclusively of compounds of formula II, are excluded:

(II)

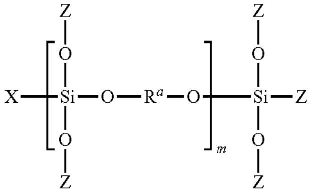

where

Z is a radical of formula —$Si(OR^b)_3$ or a radical of formula —$CR^c_3$, $R^a$ is each independently a divalent unsubstituted or substituted carbon-bonded radical or a divalent silicon-bonded radical, $R^b$ is each independently a monovalent unsubstituted or substituted hydrocarbon radical having 4 to 40 carbon atoms which is branched at the α-carbon atom or is doubly branched at the β-carbon atom, $R^c$ is each independently a monovalent unsubstituted or substituted hydrocarbon radical having 1 to 50 carbon atoms, X is a halogen atom, an oxygen-bonded unsubstituted or substituted $C_1$- to $C_{40}$-hydrocarbon radical, wherein individual carbon atoms may be replaced by oxygen atoms, a radical of formula —O—$Si(OR^b)_3$ or a radical of formula —$OSiR''_3$, $R''$ is each independently a monovalent unsubstituted or substituted $C_1$- to $C_{40}$-hydrocarbon radical and m is an integer of at least 2 and at most 1000.

3. The mixture of polymeric alkyl silicates as claimed in claim 1, wherein the polymeric alkyl silicates do not contain SiC-bonded radicals.

4. The mixture of polymeric alkyl silicates as claimed in claim 1, wherein the polymeric alkyl silicates comprise at least 2 structural elements selected from the group of formulae 1 to 10

(Formula 1)

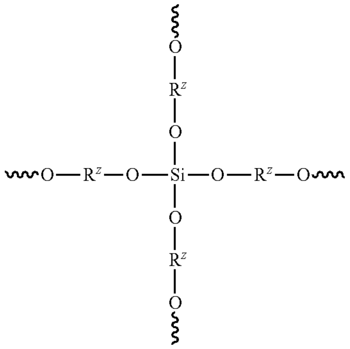

(Formula 2)

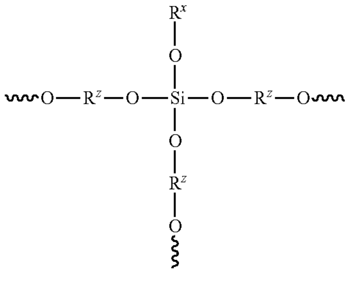

-continued (Formula 3)

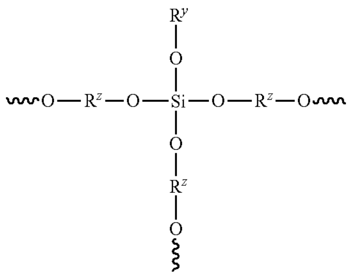

(Formula 4)

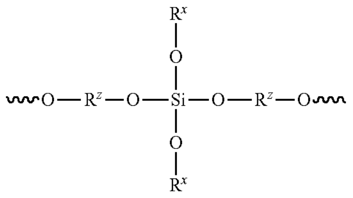

(Formula 5)

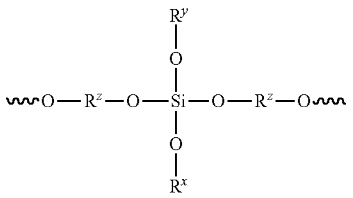

(Formula 6)

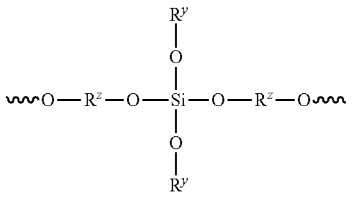

(Formula 7)

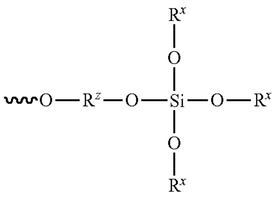

(Formula 8)

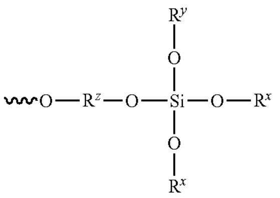

(Formula 9)

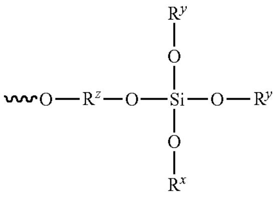

-continued (Formula 10)

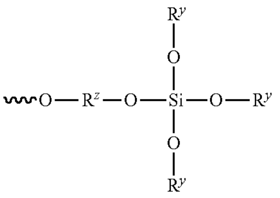

with the proviso that the sum of the number of structural units of the formulae 1+2+3+5+6 is less than 60%, based in each case on the sum of the number of all structural units, and with the proviso that if a structural unit of formula 4 is present where $R^x$ has the definition of $—CR^p{}_3$, at least one further structural unit selected from the group of formulae 1, 2, 3, 5, 6, 9 and 10 is present.

5. The mixture of polymeric alkyl silicates as claimed in claim 1, wherein $R^x$ is a radical of the formula $—CHR^p{}_2$ or $—CR^p{}_3$, wherein $R^p$ is each independently a monovalent unsubstituted or substituted hydrocarbon radical having 1 to 10 carbon atoms.

6. The mixture of polymeric alkyl silicates as claimed in claim 1, wherein the radicals $R^x$ are selected from the group consisting of tert-butyl, 2-butyl radical, 3-methyl-2-butyl, 3-methyl-2-pentyl, 3-pentyl radical, 2-hexyl radical, 3-hexyl radical, 2-heptyl radical, 2-octyl radical, 1-phenylethyl radical, 1-phenyl-1-propyl radical, 1,1-dimethylpropyl radical and mixtures thereof.

7. The mixture of polymeric alkyl silicates as claimed claim 1, wherein the radicals $R^z$ are each independently a divalent hydrocarbon radical having 3 to 200 carbon atoms, wherein the carbon atoms may be replaced by oxygen atoms or by siloxanyl radicals of the formula $—(R^3{}_2SiO)_o—SiR^3{}_2—$, wherein $R^3$ is each independently a $C_1$- to $C_{20}$-hydrocarbon radical, and o is an integer from 0 to 100.

8. The mixture of polymeric alkyl silicates as claimed in claim 1, wherein the radicals $R^z$ are selected from the group consisting of 1,3-propylene radical, 1,4-butylene radical, 1,2-cyclohexylidene radical, 1,3-cyclohexylidene radical, 1,4-cyclohexylidene radical, 1,2-phenylene radical, 1,3-phenylene radical and 1,4-phenylene radical and radicals of the formulae $—CR^4{}_2—CR^4{}_2—(OCR^4{}_2—CR^4{}_2)_p—$, $—CR^4{}_2—(CR^4{}_2)_q—(OCR^4{}_2—(CR^4{}_2)_q)_p—$, $(Me_2SiO)_o$-$Me_2Si—$, $—CH_2—CH_2—CH_2$-$(Me_2SiO)_o$-$Me_2Si—CH_2—CH_2—CH_2—$, $—CH_2—CH_2$-$(Me_2SiO)_o$-$Me_2Si—CH_2—CH_2—$ and $—CH_2$-$(Me_2SiO)_o$-$Me_2Si—CH_2—$, where Me is a methyl radical, $R^4$ may be the same or different and is a hydrogen atom or a $C_1$- to $C_{18}$-hydrocarbon radical, o is an integer from 0 to 100, p is an integer from 0 to 100, and q is an integer from 1 to 100.

9. The mixture of polymeric alkyl silicates as claimed in claim 1, wherein the indices a, b, b', c, c', c", d, d', d", d"', e', e" and e"' are each independently a number in the range from 0 to 500, wherein the index e is a number in the range from 2 to 500, with the proviso that the sum of all indices is at least 5.

10. A process for preparing the mixture of polymeric alkyl silicates of the formula (I) as claimed in claim 1, by reacting silanes (1), selected from the group consisting of tetrachlorosilane (1a), tetraalkoxysilane (1b), partial hydrolysates of tetrachlorosilane, partial hydrolysates of tetraalkoxysilane and mixtures thereof, optionally with the addition of solvents (7), with monohydroxy compounds (2) of formula $$HO—R^x,$$

optionally with the addition of primary alcohols (3) of the formula $$HO—R^y$$

and/or optionally with the addition of water (4), and with dihydroxy compounds (5) of formula $$HO—R^z—OH$$

or salts thereof, optionally in the presence of catalysts (6), simultaneously in one step or successively in two steps, with the proviso that if $SiCl_4$ (1a) is reacted with monohydroxy compounds (2) of the formula HO—$R^x$, in which $R^X$ is a radical of the formula —$CR^p_3$, at least one further compound selected from the group consisting of monohydroxy compounds (2) of the formula HO—$R^x$, in which $R^x$ has the definition stated therefor in claim 1, but is not a radical of the formula —$CR^p_3$, primary alcohols (3) of the formula HO—$R^y$, water (4) and mixtures thereof are added to the reaction mixture, and with the proviso that monohydroxy compounds (2) and primary alcohols (3) are used in amounts of 1.0 to 3.0 mol per mole of silane (1), and dihydroxy compounds (5) are used in amounts of 0.7 to 1.5 mol per mole of silane (1).

11. The process for preparing the mixture of polymeric alkyl silicates of the formula (I) as claimed in claim 10, wherein silanes (1), selected from the group consisting of tetrachlorosilane (1a), tetraalkoxysilane (1b), partial hydrolysates of tetrachlorosilane, partial hydrolysates of tetraalkoxysilane and mixtures thereof, optionally with the addition of solvents (7), are reacted with secondary alcohols (2a) or tertiary alcohols (2b) of the formula $$HO—R^x,$$

wherein $R^x$ is a radical of the formula —$CHR^p_2$ or —$CR^p_3$, optionally with the addition of primary alcohols (3) of the formula $$HO—R^y$$

and/or optionally with the addition of water (4), and with dihydroxy compounds (5) of formula $$HO—R^z—OH$$

or salts thereof, optionally in the presence of catalysts (6), simultaneously in one step or successively in two steps, with the proviso that if $SiCl_4$ (1a) is reacted with a tertiary alcohol (2b) HO—$R^x$, wherein $R^X$ is a radical of the formula —$CR^p_3$, at least one further compound selected from the group consisting of secondary alcohols (2a) HO—$R^x$, where $R^x$ is a radical of the formula —$CHR^p_2$, primary alcohols (3) HO—$R^y$, water (4) and mixtures thereof are added to the reaction mixture, and with the proviso that alcohols of the formulae HO—$R^x$ and HO—$R^y$ are used in amounts of 1.0 to 3.0 mol per mole of silane (1), and dihydroxy compounds (5) are used in amounts of 0.7 to 1.5 mol per mole of silane (1).

12. The process for preparing the mixture of polymeric alkyl silicates of the formula (I) as claimed in claim 11, wherein in a first step, silanes (1), selected from the group consisting of tetrachlorosilane (1a), tetraalkoxysilanes (1b), partial hydrolysates of tetrachlorosilane, partial hydrolysates of tetraalkoxysilane and mixtures thereof, optionally with the addition of solvents (7), with secondary alcohols (2a) or tertiary alcohols (2b) of the formula $$HO—R^x,$$

wherein $R^x$ is a radical of the formula —$CHR^p_2$ or —$CR^p_3$, optionally with the addition of primary alcohols (3) of the formula $$HO—R^y$$

and/or optionally with the addition of water (4), and in a second step, the reaction mixtures obtained from the first step are reacted with dihydroxy compounds (5) of formula $$HO—R^z—OH$$

or salts thereof, optionally in the presence of catalysts (6) and optionally with the addition of solvents (7), with the proviso that if $SiCl_4$ (1a) is reacted with a tertiary alcohol (2b) HO—$R^x$, wherein $R^X$ is a radical of the formula —$CR^p{}_3$, at least one further compound selected from the group consisting of secondary alcohols (2a) HO—$R^x$, where $R^x$ is a radical of the formula —$CHR^p{}_2$, primary alcohols (3) HO—$R^y$, water (4) and mixtures thereof are added to the reaction mixture, and with the proviso that alcohols of the formulae HO—$R^x$ and HO—$R^y$ are used in amounts of 1.0 to 3.0 mol per mole of silane (1), and dihydroxy compounds (5) are used in amounts of 0.7 to 1.5 mol per mole of silane (1).

13. The process for preparing the mixture of polymeric alkyl silicates of the formula (I) as claimed in claim 10, wherein the catalysts (6) used are nitrogen bases selected from the group consisting of pyridine, ammonia, urea, ethylenediamine, triethylamine, tributylamine and mixtures thereof.

14. The process for preparing the mixture of polymeric alkyl silicates of the formula (I) as claimed in claim 10, wherein solvents (7) are used in the second process step.

15. The process for preparing the mixture of polymeric alkyl silicates of the formula (I) as claimed in any of claim 1, by reacting compounds of the formula $Si(H)_l(OR^X)_k(OR^y)_j$ and/or partial hydrolysates thereof, where the index 1 is 1, 2, 3 or 4, preferably 1 or 2, and the indices k and j are each independently 0, 1, 2 or 3, with the proviso that the sum of 1+k+j equals 4, with dihydroxy compounds (5) of the formula $$HO—R^z—OH$$

optionally in the presence of a catalyst (6) and optionally with the addition of solvents (7)

with elimination of hydrogen.

* * * * *